Oct. 14, 1952  O. C. MONTGOMERY  2,614,157
SEALED SHAFT AND ALIGNMENT COUPLER FOR USE IN ELECTRICAL ASSEMBLY
Filed Oct. 3, 1949  2 SHEETS—SHEET 1

INVENTOR.
O. C. MONTGOMERY
BY *Hudson & Young*
ATTORNEYS

Patented Oct. 14, 1952

2,614,157

UNITED STATES PATENT OFFICE 2,614,157

SEALED SHAFT AND ALIGNMENT COUPLER FOR USE IN ELECTRICAL ASSEMBLY

Orin C. Montgomery, Bartlesville, Okla., assignor to Phillips Petroleum Company, a corporation of Delaware Application October 3, 1949, Serial No. 119,269

14 Claims. (Cl. 175—308)

This invention relates to seismic amplifiers. In another aspect, it relates to a novel coupling for a control unit, such as a variable resistance or switch, utilized in seismic amplifiers and other electrical equipment.

In seismic amplifiers, a number of seismometers are utilized to convert seismic waves into electrical voltages representative thereof. These voltages are electrically amplified, and the amplified signals are to a recording device which produces a permanent record of the waves incident upon the seismometers. Each seismometer or group of two or more seismometers requires a separate amplifier and these amplifiers are commonly mounted upon a single panel together with the appropriate control nobs and switches therefor. It is desirable that the series of amplifiers be enclosed within a moisture proof case, particularly when prospecting is carried out in tropical climates. It is, moreover, quite important that each individual amplifier may be quickly detached from the assembly and replaced, should failure of the amplifier occur. Heretofore, it has been very difficult to meet these conditions, since the provision of an adequate moisture proof casing makes it difficult to quickly remove the individual amplifier units from the assembly.

It is an object of this invention to provide a sealed, moisture proof casing for mounting a large number of seismic amplifiers so arranged that each individual amplifier may be quickly and easily detached from the assembly and replaced.

It is a further object to provide such an amplifier assembly in which the control elements, such as variable resistances and switches, may be readily detached from control shafts permanently mounted on the instrument panel.

It is a still further object to provide an assembly which is rugged in construction, reliable in operation, and which may be manufactured at low cost.

Various other objects, advantages, and features of the invention will become apparent from the following detailed description taken in conjunction with the accompanying drawings, in which.

Figure 1:
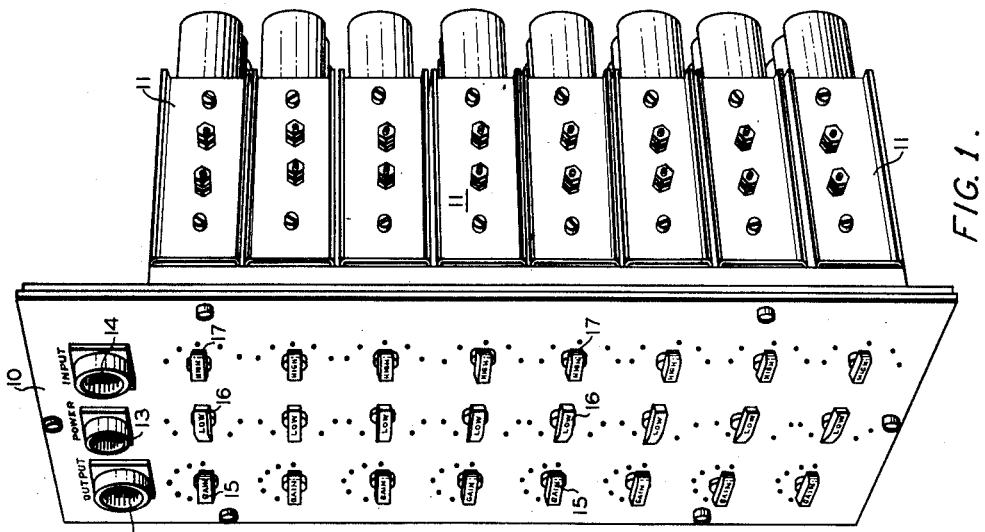
Figure 1 is a perspective view of an amplifier assembly constructed in accordance with this invention.

Referring now to the drawings and particularly to Figure 1, the assembly includes a panel 10 carrying a series of identical amplifier units 11 which are secured to the panel in the manner hereinafter described in detail. Also mounted upon the panel 10 are a plurality of plugs 12, 13 and 14, plug 13 supplying power to the assembly, plug 14 connecting the various seismometers to the respective input circuits of the amplifier 11, and plug 12 connecting the respective output circuits of the amplifiers to a suitable recording device. Associated with each of the amplifiers 11 and mounted on the panel 10, are a gain control 15, a selector switch 16, and a second selector switch 17. These control knobs are detachably connected to their corresponding control units within the amplifiers 11 in the manner hereinafter described.

Associated with the panel 10 is a cover which completely encloses the amplifier units 11 and forms a sealed moisture proof container therewith. A portion of this cover is shown at 18, Figure 2, from which it will be noted that the lower end of the cover has a flanged member 19 secured thereto, as by welding. A plurality of bolts 20 extend through suitable openings in the base 10 and a flanged member 21, and each of these bolts fits into a tapped opening in a screw 22 secured on member 19 by a nut 23. A gasket 25 is mounted between the members 19, 21 to effectively seal the region between the cover 18 and the panel 10. It will be noted from Figure 4 that the series of amplifier units is completely enclosed by the panel 10 and the cover 18.

Figure 2:
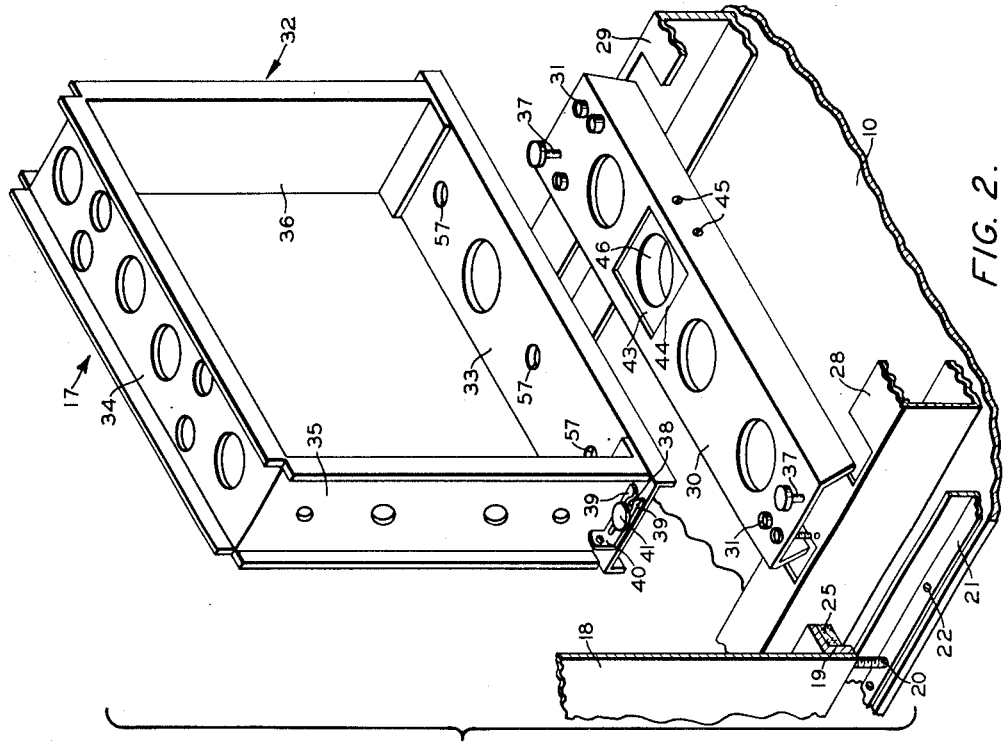
Figure 2 is a perspective view of an individual amplifier assembly with the parts in disassembled relation.

Referring now to Figure 2, it will be seen that a pair of parallel I-beams 28, 29 are mounted, as by welding, upon the inner side of the panel 10. A number of flanged plates, one of which is shown at 30, are secured transversely of the I-beams 28 and 29, as by bolts 31, one such plate being provided for each of the amplifier units 11. The electrical components of each amplifier are mounted upon a generally rectangular frame 32 consisting of a bottom piece 33, a top piece 34, and side pieces 35, 36. Each frame is detachably secured to its corresponding plate 30 so that the frame may be readily removed from the plate 30 and panel 10. To this end, a pair of rivets 37 protrude upwardly from the plate 30, the head of each rivet passing through an opening 38 in plate 33, and the shank of the rivet being gripped between spring-pressed jaws 39 of a clamp or snap slide fastener 40. The clamp 40 is slideable upon a rivet 41 and it is urged by a suitable spring, not shown, to a position wherein the jaws 39 grip the shank of rivet 37. When it is desired to detach the frame 32, the clamp 40 is simply moved away from rivet 37 so that the jaws 39 are disengaged therefrom. Thereupon, the frame 32 may be lifted as a unit from the plate 30.

Figure 4:
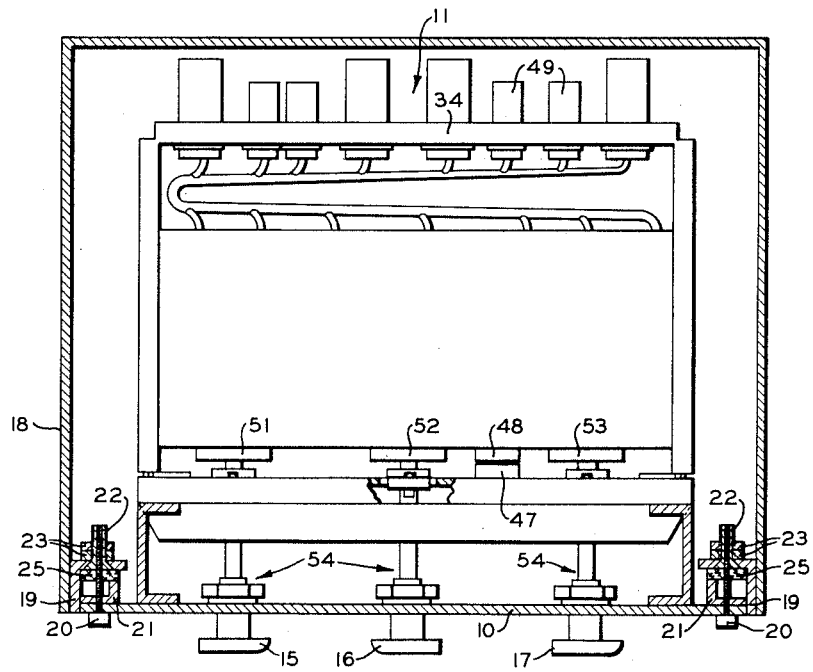
Figure 4 is a horizontal sectional view, partially in elevation, of the assembly shown by Figure 1.

A block 43 is mounted below a rectangular opening 44 in plate 30, as by screws 45, and this block has an opening 46 formed therein for receiving a socket 47, Figure 4. The amplifier 11 is equipped with a plug 48 which fits into socket 47 to supply input, output, and power connections to the amplifier. In connection with Figure 4, it will also be noted that the top piece 34 of the frame carries a number of components 49 forming a part of the amplifier unit.

Each of the amplifiers 11 further includes a gain control 51 together with rotary switches 52, 53 which regulate filter circuits in the amplifier. These control units 51, 52, and 53 are connected to the respective knobs 15, 16 and 17 by novel detachable couplings 54, one of which is shown in detail by Figure 3.

Figure 3:
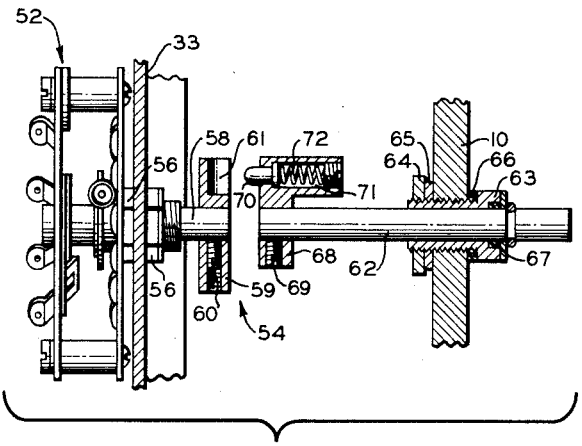
Figure 3 is a vertical sectional view of a coupling for a multiposition switch.

Referring now to Figure 3, it will be noted that a rotary switch 52 is secured to the bottom piece 33 of frame structure 32 by nuts 56, the control shaft of the switch together with the bushing therefor extending through an opening 57, Figure 2. It will be noted that similar openings 57 are provided for the variable resistor 51 and switch 53 of Figure 4.

The control shaft 58 of switch 52 has a disc-like member 59 attached thereto by a set screw 60, this disc being provided with a radially-extending slot 61. Journalled in and permanently mounted upon the panel 10 is a control rod or shaft 62 which is alined with the shaft 58. The rod 62 rotates in a threaded bushing 63 which is secured to the panel 10 by a nut 64 and a washer 65. The region between bushing 63 and panel 10 is sealed by a resilient gasket 66 which compressed by pressure exerted upon the assembly by tightening nut 64. An O-ring 67 is mounted within bushing 63 and engages the periphery of rod 62, thereby to seal the region between these parts. A suitable clinching ring and nut are provided at the outer end of the bushing 63. The outer end of rod 62 carries the knob 16, Figure 1, while its inner end carries a disc-like member 68 secured to the rod by a set screw 69. A pin 70 is mounted within an eccentrically disposed passage 71 in the member 68. A spring 72 urges the pin 70 into engagement with the slotted portion 61 of member 59, thereby to provide a mechanical connection between shaft 58 and rod 62. When the frame structure 32 is removed from plate 30, bottom piece 33 is moved leftwardly, Figure 3, relative to the panel 10 thus quickly disengaging the pin 70 from the slotted portion 61.

It will be apparent that I have provided a completely sealed enclosed compartment for the seismic amplifiers 11. This compartment is sealed around the edges of the panel 10 by the gasket 25, Figure 2, and each control rod remains permanently attached to the panel 10 and completely sealed by the action of gasket 66 and O-ring 67. Furthermore, each amplifier unit 11 may be quickly removed from the assembly and a new one substituted therefor in an expeditious manner. To remove an amplifier unit 11, it is only necessary to disengage plug 48, Figure 4, from socket 47 and release the locking devices 40, whereupon the complete amplifier unit is lifted bodily from the plate 30, the pins 70 being automatically released from the slotted portions 61 when this is done. Thereupon, a new amplifier unit may be inserted merely by placing it in position upon the plate 30 and operating the locking devices 40 to cause jaws 39 to grip the respective shanks of rivets 37. The plug 48 is then inserted into socket 47 and the dials 15, 16, 17 are turned until the respective pins 70 snap into slots 61 to mechanically connect each control rod 62 to its associated shaft 58. Proper alignment of each control rod and its associated control shaft is insured by placing the slot 61 at a definite angular position, for example, in a vertical position, with the switch or variable resistor in its full scale position. From the foregoing, it will be apparent that I have achieved the objects of my invention in providing a moisture proof enclosure for a series of seismic amplifier units in which each unit may be readily removed and replaced within a short period of time.

While the invention has been described in connection with present, preferred embodiments thereof, it will be understood that this description is illustrative only and is not intended to limit the invention, the scope of which is defined by the appended claims.

I claim:

1. The combination, with a panel, and an electrical control unit mounted on said panel, said device having a rotatable shaft, of a second panel spaced from said first panel, a bushing mounted in said second panel, a shaft journalled in said bushing in alignment with said control shaft, a disc, a set screw for mounting said disc on one of said shafts, said disc having a radially extending slot formed therein, a second disc, a set screw mounting said second disc on the other shaft, a pin mounted for longitudinal movement in said second disc and adapted to fit into said radial slot, and a spring for urging said pin into said slot, thereby to mechanically connect said shafts.

2. A device constructed in accordance with claim 1 in which the control unit is a variable resistance.

3. A device constructed in accordance with claim 1 in which the control unit is a multi-position switch.

4. The combination, with a panel, and an electrical control unit mounted on said panel, said unit having a rotatable shaft, of a second panel spaced from said first panel, a bushing mounted in said second panel, a gasket interposed between said second panel and one end of said bushing, a washer for holding said bushing in position and compressing said gasket, a shaft journalled in said bushing, an O-ring mounted in said bushing and engaging the periphery of said shaft, a disc, a set screw for mounting said disc on one of said shafts, said disc having radially extending slot formed therein, a second disc, a set screw mounting said second disc on the other shaft, a pin mounted for longitudinal movement in said second disc and adapted to fit into said radial slot, and a spring for urging said pin into said slot, thereby to mechanically connect said shafts.

5. A device constructed in accordance with claim 4 in which the control unit is a variable resistance.

6. A device constructed in accordance with claim 4 in which the control unit is a multi-position switch.

7. In a seismic amplifier, a panel, a generally rectangular frame for supporting the components of said amplifier, means for detachably securing said frame to said panel, a plurality of electrical control devices mounted on said frame adjacent said panel, each device having a rotatable shaft, a slotted disc-like member mounted on the end of each shaft, a plurality of control rods, a bushing in said panel for each control rod to journal it in proximity to one of said shafts, and a locking device carried by each rod and positioned adjacent one of said members, each locking device including a pin adapted to move into one of said slots, and a spring for urging said pin into its associated slot.

8. A seismic amplifier constructed in accordance with claim 7 in which a sealing gasket is mounted between each bushing and said panel, and in which an O-ring is mounted in each bushing in engagement with the periphery of said control rod.

9. In a seismic amplifier, in combination, a panel, a plate secured to said panel and spaced therefrom, a generally rectangular frame for supporting the components of said amplifier, a spring-actuated locking device for detachably securing said frame to said plate, a socket mounted in said plate, a plug forming a part of said amplifier and carried by said frame, said plug and socket defining a detachable device for making a plurality of electrical connections between said frame and said panel, a plurality of electrical control devices mounted on said frame, each such device having a control shaft extending through an opening in said plate, a plurality of control rods mounted on said panel, each rod cooperating with one of said shafts, and means for detachably connecting each rod to its associated shaft, whereby the frame may be readily removed from the panel.

10. In a seismic amplifier, in combination, a panel, a plate secured to said panel and spaced therefrom, a generally rectangular frame for supporting the components of said amplifier, a spring-actuated locking device for detachably securing said frame to said plate, a socket mounted in said plate, a plug forming a part of said amplifier and carried by said frame, said plug and socket defining a detachable device for making a plurality of electrical connections between said frame and said panel, a plurality of electrical control devices mounted on said frame, each such device having a control shaft extending through an opening in said plate, a plurality of control rods, a bushing in said panel for each control rod to journal it in proximity to one of said shafts, and a locking device carried by each rod and positioned adjacent one of said members, each locking device including a pin adapted to move into one of said slots, and a spring for urging said pin into its associated slot.

11. A seismic amplifier comprising, in combination, a panel, a plurality of amplifier units each including a frame for housing the amplifier components, a plurality of electrical control devices mounted on each frame, each device having a rotatable control shaft, a pair of parallel I-beams mounted on said panel, a pair of spring-actuated locking devices for detachably securing each frame to said I-beams, a plurality of control rods, one for each shaft, a bushing for journaling each control rod in said panel in alignment with its associated shaft, means for detachably connecting each rod to its associated shaft, a gasket for sealing the region between each bushing and said panel, an O-ring for sealing the region between each bushing and its associated control rod, a cover, means for detachably securing said cover to said panel to enclose all of said amplifier units, and means for sealing the region between said cover and said panel.

12. A seismic amplifier comprising, in combination, a panel, a plurality of amplifier units each including a frame for housing the amplifier components, a plurality of electrical control devices mounted on each frame, each device having a rotatable control shaft, a pair of parallel I-beams mounted on said panel, a pair of spring-actuated locking devices for detachably securing each frame to said I-beams, a plurality of control rods, one for each shaft, a bushing for journaling each control rod in said panel in alignment with its associated shaft, a gasket for sealing the region between each bushing and said panel, an O-ring for sealing the region between each bushing and its associated control rod, a channel-shaped member mounted along the edge of said panel, a gasket mounted on said channel-shaped member and extending throughout the length thereof, a cover, and a plurality of screws for securing said cover to said panel, said cover having a metal edge which engages said gasket throughout its length upon attachment of the cover to the panel.

13. A seismic amplifier comprising, in combination, a panel, a pair of parallel spaced I-beams secured to said panel and extending substantially the length thereof, a series of parallel flanged metal plates secured to said I-beams, a series of frames, one for each plate, for mounting amplifier components, a pair of spring-actuated locking devices for securing each frame to its associated plate, a plurality of electrical control devices carried by each frame, each such device having a control shaft extending through an opening in the associated plate, a plurality of control rods, one for each shaft, a bushing mounted in said panel for journaling each control rod in a position in alinement with its associated control shaft, a spring-actuated detent device for detachably coupling each control rod to its associated shaft, a gasket for sealing the region between each bushing and said panel, an O-ring for sealing the region between each bushing and its associated control rod, a socket mounted on each plate for making electrical connections to its associated amplifier, a plug carried by each frame for insertion into its corresponding socket, a cover, means for detachably securing said cover to said panel to enclose all of said amplifier units, and a gasket for sealing the region between said cover and said panel.

14. In a seismic amplifier, in combination, a panel, a series of frames each supporting the components of an amplifier, means for detachably securing each frame to said panel, detachable means for making a plurality of electrical connections between the amplifier components on each frame and other components associated with said panel, a plurality of electrical control devices mounted on each frame, each such device having a control shaft extending through a nopening in said frame, a plurality of control rods mounted on said panel, each rod cooperating with one of said shafts, and means for detachably connecting each rod to its associated shaft, whereby the frame may be readily removed from the panel.

ORIN C. MONTGOMERY.

(References on following page)

REFERENCES CITED

The following references are of record in the file of this patent:

UNITED STATES PATENTS

| Number | Name | Date |
|---|---|---|
| 1,732,346 | Waller | Oct. 22, 1929 |
| 1,809,025 | Cruser | June 9, 1931 |
| 1,930,028 | Adam | Oct. 10, 1933 |
| 2,077,160 | Wilson | Apr. 13, 1937 |
| 2,168,720 | Triplett | Aug. 8, 1939 |
| 2,185,562 | Nielsen | Jan. 2, 1940 |
| 2,287,243 | Hebert | June 23, 1942 |
| 2,344,441 | Lorenz | Mar. 14, 1944 |
| 2,526,901 | Robbins | Oct. 24, 1950 |